US009275420B1

(12) United States Patent
Fredinburg et al.

(10) Patent No.: US 9,275,420 B1
(45) Date of Patent: Mar. 1, 2016

(54) CHANGING USER PROFILE IMPRESSION

(71) Applicant: Google Inc., Mountain View, CA (US)

(72) Inventors: Dan Fredinburg, San Francisco, CA (US); Andrew Swerdlow, San Francisco, CA (US)

(73) Assignee: Google Inc., Mountain View, CA (US)

( * ) Notice: Subject to any disclaimer, the term of this patent is extended or adjusted under 35 U.S.C. 154(b) by 234 days.

(21) Appl. No.: 13/645,866

(22) Filed: Oct. 5, 2012

(51) Int. Cl.
*G06F 3/00* (2006.01)
*G06Q 50/00* (2012.01)
*G06F 3/048* (2013.01)
*G06F 3/0481* (2013.01)

(52) U.S. Cl.
CPC ............... *G06Q 50/01* (2013.01); *G06F 3/048* (2013.01); *G06F 3/0481* (2013.01)

(58) Field of Classification Search
CPC ........ G06Q 50/01; G06F 3/048; G06F 3/0481
USPC .......................................... 715/753; 705/319
See application file for complete search history.

(56) References Cited

U.S. PATENT DOCUMENTS

| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 8,375,331 | B1 * | 2/2013 | Mayers ..................... 715/835 |
| 2002/0137490 | A1 | 9/2002 | Gallant |
| 2002/0143874 | A1 | 10/2002 | Marquette et al. |
| 2003/0154180 | A1 * | 8/2003 | Case et al. ................ 707/1 |
| 2004/0258220 | A1 | 12/2004 | Levine et al. |
| 2005/0152521 | A1 | 7/2005 | Liljestrand |

(Continued)

FOREIGN PATENT DOCUMENTS

WO        WO0279984        10/2002

OTHER PUBLICATIONS

Golijan, Rosa. "Digital Life—New tool helps clean up your Facebook reputation." Today. Archived Apr. 29, 2012. Web. Oct. 31, 2014. http://digitallife.today.com/_news/2011/04/07/6425061-new-tool-helps-clean-up-your-facebook-reputation.*

(Continued)

*Primary Examiner* — Jennifer To
*Assistant Examiner* — John Repsher, III
(74) *Attorney, Agent, or Firm* — Fish & Richardson P.C.

(57) ABSTRACT

The disclosure includes a system and method for changing user profile impression. The system includes a controller, a preview module, a determination module and a graphical user interface module. The controller receives an input describing a selection of a profile impression from a user. The preview module determines profile preview data based at least in part on the selection and source data describing one or more user activities. The determination module receives user review data that describes a user review input based at least in part on the profile preview data. The determination module determines profile impression data based at least in part on the profile preview data and the user review data. The graphical user interface module determines graphical data based at least in part on the profile impression data.

17 Claims, 11 Drawing Sheets

(56) References Cited

U.S. PATENT DOCUMENTS

| | | | |
|---|---|---|---|
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0046976 | A1* | 2/2008 | Zuckerberg ............... 726/4 |
| 2008/0056475 | A1 | 3/2008 | Brannick et al. |
| 2008/0192656 | A1 | 8/2008 | Vagelos |
| 2009/0313546 | A1* | 12/2009 | Katpelly et al. ............. 715/723 |
| 2010/0185640 | A1* | 7/2010 | Dettinger et al. ............ 707/758 |
| 2011/0004922 | A1* | 1/2011 | Bono et al. .................. 726/4 |
| 2011/0098156 | A1 | 4/2011 | Ng et al. |
| 2011/0264528 | A1* | 10/2011 | Whale ........................ 705/14.58 |
| 2011/0289011 | A1* | 11/2011 | Hull et al. .................... 705/319 |
| 2012/0197733 | A1* | 8/2012 | Skomoroch et al. ....... 705/14.66 |
| 2012/0203846 | A1* | 8/2012 | Hull et al. ..................... 709/206 |
| 2012/0246137 | A1* | 9/2012 | Sallakonda et al. ......... 707/709 |
| 2012/0260209 | A1* | 10/2012 | Stibel et al. .................. 715/780 |
| 2013/0066730 | A1* | 3/2013 | Myslinski .................. 705/14.73 |
| 2013/0236070 | A1* | 9/2013 | Sliwinski ..................... 382/118 |
| 2013/0290050 | A1* | 10/2013 | Gross et al. .................. 705/7.13 |
| 2013/0340089 | A1* | 12/2013 | Steinberg et al. ............. 726/27 |
| 2014/0082198 | A1* | 3/2014 | Blattner et al. ............... 709/225 |

OTHER PUBLICATIONS

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institude of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

At&T Personal Reach Service: Benefits and Features, Mar. 29, 2010, 7 pgs.

At&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

CHANGING USER PROFILE IMPRESSION

BACKGROUND

The present disclosure relates to social networks and the presentation of content. In particular, the present disclosure relates to changing user profile impression in social networks.

The popularity and use of social networks has grown dramatically in recent years. In particular, social networks have become a very popular and a preferred method for interaction with others. A user may share online activities with other users including friends, family members, etc., via a social feed posted on a social network. At some point, a user might not like the way they are perceived online by others. For example, a new mother wants to put her party days in the past; a professional has issues with co-workers saying his online profile is unprofessional; etc. It may be highly desirable to provide a tool for users to change their profile impressions easily at any time.

SUMMARY

According to one innovative aspect of the subject matter described in this disclosure, a system for changing user profile impression is described. The system includes: a controller for receiving an input describing a selection of a profile impression from a user; a preview module for determining profile preview data based at least in part on the selection of the profile impression and source data describing one or more user activities, the profile preview data describing one or more recommended changes for the source data; a determination module for receiving user review data from the user, the user review data describing a user review input that indicates whether the user agrees with the one or more recommended changes for the source data described by the profile preview data, the determination module determining profile impression data based at least in part on the profile preview data and the user review data, the profile impression data describing the one or more user activities based at least in part on the user review data; and a graphical user interface module for determining graphical data based at least in part on the profile impression data.

In general, another innovative aspect of the subject matter described in this disclosure may be embodied in methods that include receiving an input describing a selection of a profile impression from a user; determining profile preview data based at least in part on the selection of the profile impression and source data describing one or more user activities, the profile preview data describing one or more recommended changes for the source data; receiving user review data from the user, the user review data describing a user review input that indicates whether the user agrees with the one or more recommended changes for the source data described by the profile preview data; determining profile impression data based at least in part on the profile preview data and the user review data, the profile impression data describing the one or more user activities the based at least in part on the user review data; and determining graphical data based at least in part on the profile impression data.

Other aspects include corresponding methods, systems, apparatuses, and computer program products for these and other innovative aspects.

These and other implementations may each optionally include one or more of the following operations. For instance, the operations further include: retrieving the source data and modifying the source data based at least in part on the selection of the profile impression; removing a portion of the source data based at least in part on the selection of the profile impression; determining a profile impression review interface based at least in part on the profile preview data; modifying an access control list for the source data based at least in part on the user review data and determining the profile impression data based at least in part on the access control list; removing a portion of the source data based at least in part on the user review data; modifying a user interest based at least in part on the user review data.

The present disclosure may be particularly advantageous in a number of respects. First, the system can provide a one-click option to change the way users are perceived by others online. Second, the system can provide profile preview data for users to review and to choose if they want the changes specified by the profile preview data. Third, the system can evaluate profile impressions to give users sense of how they will be perceived as the type of person they choose to be. Fourth, the system can update user interests based at least in part on user feedback during the process of changing profile impressions, therefore can personalize products and product settings to provide a better product experience for users.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
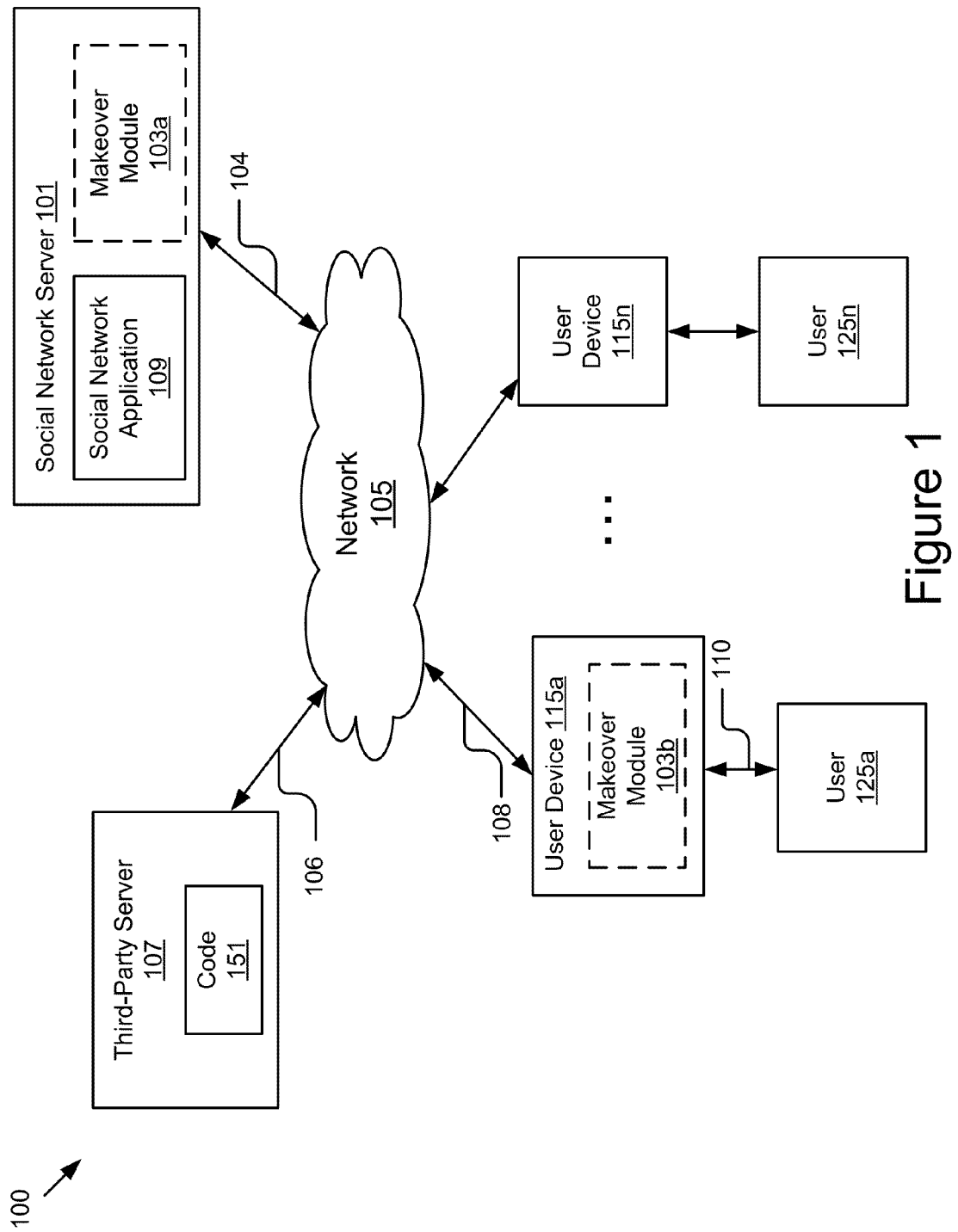
FIG. 1 is a block diagram illustrating an example system for changing profile impressions for users.

FIG. 1 illustrates a block diagram of some implementations of a system 100 for changing a profile impression for a user. The illustrated system 100 for changing a profile impression for a user includes a social network server 101, a network 105, a third-party server 107 and one or more user devices 115a-115n (also referred to herein individually and collectively as 115) that are accessed by users 125a-125n (also referred to herein individually and collectively as 125). In the illustrated implementation, these entities are communicatively coupled via the network 105. Although only two user devices 115 are illustrated, it should be understood that any numbers of user devices 115 are available to any number of users 125. Moreover, while the present disclosure is described below primarily in the context of changing a profile impression for a user, the present disclosure is applicable to improving user experience with other aspects of a social network.

The user devices 115a, 115n in FIG. 1 are used by way of example. While FIG. 1 illustrates two user devices 115, the present disclosure applies to any system architecture having one or more user devices 115. Furthermore, while only one network 105 is coupled to the social network server 101, the third-party server 107 and the user devices 115a, 115n, in practice any number of networks 105 can be connected to these entities. Furthermore, while only one third-party server 107 is shown, the system 100 could include one or more third-party servers 107.

While shown as stand-alone server in FIG. 1, in other implementations all or part of the social network server 101 could be part of the third-party server 107 that is connected to the network 105. The social network server 101 interacts via signal line 104 and the network 105 with the third-party server 107 and user devices 115a-115n. In some implementations, the social network server 101 cooperates with the user device 115 to generate and present user interfaces for showing user content streams based at least in part on different profile impression selections. The social network server 101 also obtains data from these other system and components to determine information about a user's context, state and interests. The social network server 101 is coupled for communication with the user device 115a, which is connected to the network 105 via signal line 108. The user 125a interacts with the user device 115a as represented by the signal line 110. Similarly, the user device 115n is coupled to the network 105 via a signal line and the user 125n interacts with the user device 115n as represented by a signal line. It should be understood that the social network server 101 can be stored in any combination of the devices and servers, or in only one of the devices or servers. The third-party server 107 is coupled to the network 105 by signal line 106, respectively for communication with the social network server 101 and the user devices 115.

In some implementations, the social network server 101 and the third-party server 107 are hardware servers that include a processor, memory, and network communication capabilities.

The social network server 101 as depicted in FIG. 1 includes a social network application 109. Although only one social network server 101 is shown, it should be understood that multiple social network servers 101 may be present. A social network is any type of social structure where the users are connected by a common feature. The common feature includes friendship, family, work, an interest, etc. The common features are provided by one or more social networking systems including explicitly-defined relationships and relationships implied by social connections with other online users, where the relationships form a social graph 118 (see FIG. 2). In some examples, the social graph 118 can reflect a mapping of these users and how they are related. Furthermore, it should be understood that social network server 101 and social network application 109 are representatives of one social network and that there can be multiple social networks coupled to the network 105, each having its own server, application and social graph. For example, a first social network is more directed to business networking, a second is more directed to or centered on academics, a third is more directed to local business, a fourth is directed to dating and others of a general interest or a specific focus.

The social network server 101 also includes a makeover module 103a (also referred to herein individually and collectively as 103). In some implementations, the makeover module 103 can be included in the user device 115. For example, the makeover module 103b is stored in the user device 115a, which is connected to the network 105 via signal line 108. In some implementations (not shown), the makeover module 103 can be stored on a third-party server 107, which is connected to the network 105 via signal line 106. It should be understood that the makeover module 103 can be stored in any combination on the devices and servers. The operation functionality of the makeover module 103 is described in more detail below with reference to FIGS. 2-7C.

In some implementations, a code 151 can be stored on the third-party server 107, which is communicatively coupled to the network 105 via signal line 106. The third-party server 107 includes an application and/or software for generating a third-party website (not shown). In some implementations, the code 151 can be code or routines configured to enable the application and/or software included in the third-party server 107 to communicate with the makeover module 103 and/or the social network application 109 so that the application and/or software can use the services provided by the makeover module 103 and/or the social network application 109. For example, the code 151 communicates with the social network application 109 to generate an option for acknowledgement indications and incorporate it within the third-party website for users visiting the third-party website to indicate an acknowledgement on at least one item present in the third-party website. In some implementations, the code 151 can be a snippet that includes HyperText Markup Language code ("HTML code") that can be configured to communicate with the makeover module 103 and/or the social network application 109 to exchange data, information and/or commands. In some implementations, the code 151 includes code from a group of C, C++, Java, CSS and PHP. Furthermore, while only one code 151 is shown in the third-party server 107, the third-party server 107 could include one or more codes 151.

The network 105 can be wired or wireless, and may have any number of configurations including a star configuration, token ring configuration or other configurations. Furthermore, the network 105 may include a local area network (LAN), a wide area network (WAN) (e.g., the Internet), and/or any other interconnected data path across which multiple devices may communicate. In yet another implementation, the network 105 may be a peer-to-peer network. The network 105 may also be coupled to or includes portions of a telecommunications network for sending data in a variety of different communication protocols. In yet another implementation, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 2:
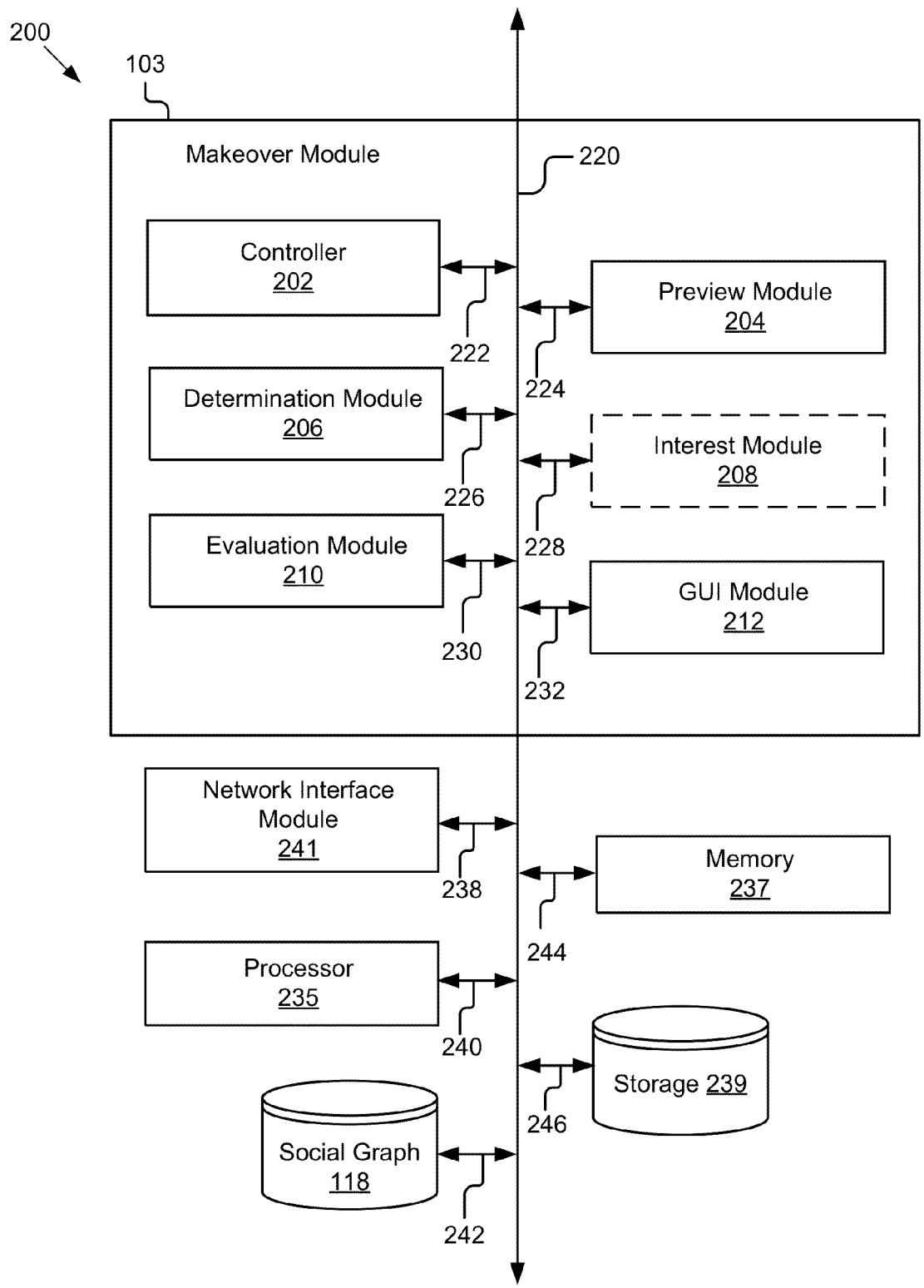
FIG. 2 is a block diagram illustrating an example of a makeover module.

Referring now to FIG. 2, the makeover module 103 is shown in more detail. FIG. 2 is a block diagram of some implementations of a computing device 200 that includes the makeover module 103, a memory 237, a processor 235, a storage 239, a social graph 118 and a network interface module 241. Optionally, the computing device 200 can be a social network server 101. In some implementations, the computing device 200 can be a user device 115. In some implementations, the computing device 200 can be a third-party server 107.

The network interface module 241 can be coupled to network 105 by a signal line (not shown) and also coupled to the bus 220 via signal line 238. The network interface module 241 includes ports for wired connectivity including USB, SD, or CAT-5, etc. The network interface module 241 links the processor 235 to the network 105 that may in turn be coupled to other processing systems. The network interface module 241 provides other connections to the network 105 using network protocols including TCP/IP, HTTP, HTTPS or SMTP. In other implementations, the network interface module 241 includes a transceiver for sending and receiving signals using Wi-Fi, Bluetooth® or cellular communications for wireless communication.

The processor 235 includes an arithmetic logic unit, a microprocessor, a general-purpose controller or some other processor array to perform computations and provide electronic display signals to a display device. The processor 235 can be coupled to the bus 220 via signal line 240 for communication with the other components. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Other processors, operating systems, sensors, displays and physical configurations are possible.

The memory 237 stores instructions and/or data that may be executed by processor 235. The memory 237 can be coupled to the bus 220 via signal line 244 for communication with the other components. The instructions and/or data may include code for performing any and/or all of the techniques described herein. The memory 237 may be a dynamic random access memory (DRAM) device, a static random access memory (SRAM) device, flash memory or some other memory device.

The social graph 118 is described above with reference to FIG. 1, and so the descriptions of its functionality will not be repeated herein. The social graph 118 can be communicatively coupled to the bus 220 via signal line 242 for communication with the other components. In some implementations, the computing device 200 can include one or more social graphs that store data describing relationships between users for different social networks.

In some implementations, the storage 239 stores data, information and instructions used by the makeover module 103. Such stored information includes information about users, messages, posts, photos, and other information. The storage 239 may be a non-volatile memory or similar permanent storage device and media, for example, a hard disk drive, a floppy disk drive, a CD ROM device, a DVD ROM device, a DVD RAM device, a DVD RW device, a flash memory device, or some other mass storage device for storing information on a more permanent basis. The storage 239 can be coupled to the bus 220 via signal line 246 for communication with other components 202, 204, 206, 208, 210, 212, 118, 235, 237 and 241 of the computing device 200.

In some instances, the data stored in the storage 239 includes profile impression catalog, source data, criteria, profile preview data, profile impression data and interest data. In some implementations, the criteria can be combined with the profile impression catalog.

The profile impression catalog includes data describing a list of profile impressions. In some implementations, a profile impression is a configuration of a user profile with the social network application 109 that is designed to make a first user 125 appear a certain way to other second users 125 who view the user profile. For example, assume a first user 125 has an account with the social network application 109. The first user 125 has uploaded pictures, videos and status updates to the social network application 109. The uploaded pictures, videos and status updates are examples of user activity data. Some of these pictures, videos or status updates includes things that make the first user 125 appear unprofessional. For example, the first user 125 is a college student and has uploaded embarrassing pictures that depict the first user 125 in an intoxicated state. As a result, when other second users 125 view the first user's 125 profile with the social network application 109, the second users 125 are left with the impression that the first user 125 is unprofessional. The first user 125 is getting ready to graduate from college and would like to create the impression that they are professional. For example, the first user 125 wants to remove any pictures, videos and status updates from the user profile with the social network application 109 that make the first user 125 appear unprofessional. Accordingly, in this example the first user 125 selects the "professional" profile impression from the profile impression catalog. As described in more detail below, the makeover module 103 then modifies the user profile for the first user 125 so that it leaves other second users 125 with the impression that the first user 125 is professional. Accordingly, the profile impression is a configuration of a user profile for a first user 125 that is designed to cause other second users 125 to perceive the first user 125 in a predetermined way.

The profile impression catalog can include other profile impressions that can be selected by the first user 125. In some implementations, the profile impression catalog includes a list of profile impressions, and the list of profile impressions includes a professional profile impression, a rock star profile impression, a parent profile impression, a student profile impression, an expert profile impression, an academic profile impression, etc. In some implementations, the makeover module 103 modifies the user activity data associated with the first user profile in order to implement the profile impression selected by the first user 125. For example, the makeover module 103 determines whether pictures, videos and/or status updates uploaded by the first user 125 to the social network application 109 are consistent with the profile impression selected by the first user 125. If any of the pictures, videos and status updates is inconsistent with the selected profile impression, the makeover module 103 configures the inconsistent pictures, videos and/or status updates so that second users 125 cannot view them. In some implementations, the profile impression catalog also includes data describing definitions and/or features related to the profile impressions. For example, the profile impression catalog includes data defining a professional profile impression.

The source data includes data describing a user activity history in a social network. For example, the source data describes one or more user activities, e.g., photos, posts, videos, documents, etc., submitted by a user and connections for the user specified by the social graph 118. In some implementations, the source data also includes data describing user settings for social networks. In some implementations, the source data can be retrieved by the preview module 204 from a group of sources including databases and websites. In some implementations, the source data can be stored in the storage 239 by the makeover module 103 for a later use by the preview module 204. The preview module 204 is described below in more detail.

The criteria include data describing one or more guidelines for showing user content to exemplify a profile impression. For example, the criteria include data describing guidelines for showing user content to exemplify a professional profile impression. The guidelines include showing work related content, hiding content that is contradictory, etc.

The profile preview data includes data describing an estimation of the way that content will be displayed to exemplify a profile impression. For example, the profile preview data includes one or more suggestions of which and how user activity data from the user profile with the social network application 109 will be modified to exemplify a profile impression selected by a user 125. In some implementations, the profile preview data can be generated based at least in part on the source data.

In some implementations, the profile preview data is data for generating a recommended profile impression. For example, assume that a first user 125 selects the "professional" profile impression from the profile impression catalog. Selecting the "professional" profile impression indicates that the first user 125 wants to leave other second users 125 with the impression that the first user 125 has the attributes of a professional. The makeover module 103 determines which pictures, videos and status updates uploaded by the first user 125 are inconsistent with the professional profile impression, and then hides the inconsistent pictures, videos and/or status updates so that second users 125 cannot view them. The result is an example of a recommended profile impression. The data that describes the recommended profile impression is the profile preview data. For example, the profile preview data is graphical data used to display the recommended profile impression on a display device associated with the user device 115.

The ability provide a recommended profile impression is particularly beneficial because, for example, some users 125 lack the judgment to determine which pictures, videos and status updates will need to be hidden in order to create a desired profile impression. For example, the first user 125 is a college student and has never worked as a professional before. The first user 125 does not know whether the pictures, videos and/or status updates uploaded by the first user 125 to the social network application 109 are consistent with a professional profile impression. The first user 125 also may not know how to change the pictures, videos and/or status updates so that other second users 125 perceive the first user 125 as a professional. Accordingly, as described in more detail below, the makeover module 103 determines whether the pictures, videos and/or status updates uploaded by the first user 125 to the social network application 109 are inconsistent with a professional profile impression, thereby providing the first user 125 with a recommended profile impression that overcomes the first user's 125 lack of judgment regarding how to modify their user profile data so as to create the impression that the first user 125 is a professional. As described in more detail below, in some embodiments the first user 125 subsequently has the opportunity to input review data. The review data includes data that indicates whether the first user 125 agrees with the changes indicated by the recommended profile impression. For example, the recommended profile impression may indicate that a particular picture should be deleted. However, the first user 125 disagrees with this recommendation and provides review data indicating that the picture should not be deleted. The review data will be described in more detail below.

In some implementations, the profile preview data can be generated based at least in part on example data. In some implementations, example data can include example photos, example documents, example posts, example videos, example status updates, etc. Similar to the profile preview data generated based at least in part on the source data, the profile preview data generated based at least in part on the example data describes one or more recommended changes for the example data in order to implement a profile impression selected by the first user 125. As described in more detail below, the makeover module 103 determines whether example photos, example videos, example posts and/or example status updates are consistent with the profile impression selected by the first user 125 and changes the example photos, example videos, example posts and/or example status updates to implement the selected profile impression. In some implementations, the makeover module 103 generates the profile preview data describing one or more recommended changes for the example photos, example videos, example posts and/or example status updates for the first user 125 to review. The first user 125 can authorize the changes to implement the selected profile impression without any knowledge or judgment for the selected profile impression.

The profile impression data includes data describing modified user activity data based at least in part on a profile impression. In some implementations, the profile impression data is based at least in part on profile preview data and user review data. In some implementations, the profile impression data includes user content in a social network that is modified to exemplify a user selected profile impression. For example, the profile impression data includes modified posts, videos, photos, documents, etc., for exemplifying a professional profile impression.

The interest data includes data describing one or more user interests. In some implementations, the interest data includes updated user interests by the interest module 208 for providing personalized product settings and product experiences for users. The interest module 208 is described below in more detail.

Referring to FIG. 2, the makeover module 103 is shown in greater detail. The makeover module 103 includes a controller 202, a preview module 204, a determination module 206, an interest module 208, an evaluation module 210 and a Graphical User Interface ("GUI") module 212. The interest module 208 is depicted in FIG. 2 using a dashed line to indicate that it is an optional element for the makeover module 103. Accordingly, in some implementations, the makeover module 103 does not include the interest module 208 and the functionality of the interest module 208 is performed by the determination module 206.

One function of the makeover module 103 can be to modify user content stream based at least in part on user selections for profile impressions. These components 202, 204, 206, 208, 210 and 212 are coupled to the bus 220 for communication with each other and the other components 118, 241, 235, 237 and 239 of the computing device 200. The bus 220 can be any type of communication bus. The operation of these modules 202, 204, 206, 208, 210 and 212 will be described in more detail below with reference to FIGS. 3-7C.

The controller 202 can be software including routines for receiving data via the network interface module 241, routing data to an appropriate module and transmitting responses from modules to the network interface module 241 for transmission to other components in the system 100. In some implementations, the controller 202 can be a set of instructions executed by the processor 235 to provide functionality described below for handling communications between the makeover module 103 and other components of the computing device 200. In some implementations, the controller 202 can be stored in the memory 237 of the computing device 200 and can be accessible and executable by the processor 235. The controller 202 may be adapted for cooperation and communication with the processor 235 and other components of the computing device 200 via signal line 222.

In some implementations, the controller 202 sends and receives data, via the network interface module 241, to and from the user device 115, the social network server 101 and the third party server 107. For example, the controller 202 receives, via the network interface module 241, a user input describing a selection of a profile impression from a user device 115 and sends the user input to the preview module 204. A profile impression indicates the way that a user is perceived online by other users. In some implementations, the GUI module 212 provides a GUI showing user content in a social network. The GUI includes functionality to enable a user to provide input describing a selection of a profile impression that indicates the way the user wants to be perceived by other users. For example, a user 125, via the GUI, selects a professional profile impression indicating that the user wants to be perceived as a professional. In some implementations, the GUI includes a list of profile impressions that are predefined by a human administrator of the social network server 101. A profile impression catalog is stored by the human administrator in the storage 239. The profile impression catalog describes definitions and/or features related to the list of profile impressions.

In some instances, the controller 202 receives preview graphical data from the GUI module 212 for providing a profile impression review interface and sends, via the network interface module 241, the preview graphical data to a user device 115, causing the user device 115 to present the profile impression review interface to a user 125. In some instances, the controller 202 receives, via the network interface module 241, user review data describing user review inputs provided to the profile impression review interface in a user device 115 and sends the user review data to the determination module 206. In some instances, the controller 202 receives content graphical data for providing a user interface that displays user content stream from the GUI module 212 and sends, via the network interface module 241, the content graphical data to a user device 115, causing the user device 115 to present the user interface displaying user content stream to a user 125.

In some implementations, the controller 202 receives data from other components of the makeover module 103 and stores the data in the storage 239. For example, the controller 202 receives profile preview data from the preview module 204 and stores the profile preview data in the storage 239. In some implementations, the controller 202 retrieves data from the storage 239 and sends the data to other components of the makeover module 103. For example, the controller 202 retrieves criteria from the storage 239 and sends the criteria to the preview module 204.

The preview module 204 can be software including routines for generating profile preview data based at least in part on a selection of a profile impression. In some implementations, the preview module 204 can be a set of instructions executable by the processor 235 to provide the functionality described below for generating profile preview data based at least in part on a selection of a profile impression. In some implementations, the preview module 204 can be stored in the memory 237 of the computing device 200 and can be accessible and executable by the processor 235. The preview module 204 may be adapted for cooperation and communication with the processor 235 and other components of the computing device 200 via signal line 224.

In some implementations, the preview module 204 receives a user input describing a selection of a profile impression. As described above with reference to controller 202, a selection of a profile impression indicates the way that a user wants to be perceived online by other users. In some implementations, the preview module 204 receives a selection indicating a profile impression from a list of one or more profile impressions. For example, the list of one or more profile impressions includes a professional profile impression, a rock star profile impression, a parent profile impression, a student profile impression (e.g., a college student profile impression), an expert profile impression (e.g., an expert in software engineering profile impression), etc. In some instances, a professional profile impression indicates that a user wants to be perceived as a professional. For example, the professional profile impression indicates that the user wants to show more work related content (e.g., posts related to work, pictures showing work meetings, videos displaying work achievements, etc.) and to hide content unrelated to work (e.g., pictures or videos including beer cans, showing overnight parties, etc.). A parent profile impression indicates that a user wants to show more parent related content (e.g., videos for newborn babies, pictures for celebrating children's birthdays, etc.) and to hide other content unrelated to being a parent.

In some implementations, the preview module 204 retrieves the profile impression catalog from the storage 239 responsive to receiving the user input describing a selection of a profile impression. In some instances, the profile impression catalog includes data describing definitions and/or features about profile impressions. For example, the profile impression catalog stores data describing the professional profile impression (e.g., data describing that for the professional profile impression which kind of content needs to be shown, highlighted, ranked higher, or hidden). For example, the preview module 204 retrieves the data describing the professional profile impression from the profile impression catalog responsive to receiving a user input describing a selection of a professional profile impression.

In some implementations, the preview module 204 determines profile preview data based at least in part on the profile impression catalog data describing the user selected profile impression. In some implementations, the profile preview data includes data describing an estimation of which and how content will be displayed in the user's social network based at least in part on the selected profile impression. For example, assume that a user 125 selects a professional profile impression. The profile preview data includes data describing one or more recommended changes for the user activity data from the user profile with the social network application 109 in order to implement the professional profile impression. For example, the profile preview data describes one or more suggestions about modifying pictures, videos and/or status updates from the user profile with the social network application 109 so that the modified pictures, videos and/or status updates can give viewers a profile impression of the user 125.

In some implementations, the preview module 204 retrieves the user's source data describing a user activity history for the user 125 and determines profile preview data based at least in part on the profile impression catalog data and the user's source data. For example, the user's source data describes one or more user activities, e.g., photos, posts, documents, videos, status updates, etc., submitted by the user 125 and connections for the user 125 specified by the social graph 118. In some implementations, the preview module 204 retrieves the user's source data from a group of sources including databases and websites. In some implementations, the source data is stored in the storage 239 by the makeover module 103 and the preview module 204 retrieves the source data from the storage 239. In some implementations, the preview module 204 modifies the user's source data based at least in part on the profile impression catalog data describing the user selected profile impression to give the user an estimation of how the source data will be changed to exemplify the selected profile impression. Accordingly, the preview module 204 determines the profile preview data describing the modifications of the source data as recommendations to the user 125. In some instances, the preview module 204 applies a filter to the user's source data. The filter is tailored based at least in part on the profile impression catalog data. After applying the filter, some content in the source data is determined to be shown; some content in the source data is determined to be hidden. For example, the preview module 204 determines profile preview data describing which content is recommended to be shown, highlighted, ranked higher, etc., and which content is recommended to be hidden, ranked lower, etc.

In some implementations, the preview module 204 determines the profile preview data using example data. For example, the preview module 204 determines which content will be displayed and/or hidden to exemplify a selected profile impression using example data. In some implementations, the preview module 204 determines how content will be displayed to exemplify a selected profile impression using example data. Accordingly, in some implementations, the preview module 204 determines the profile preview data describing any recommended changes regarding which content will be displayed and/or hidden and how content will be displayed. In some implementations, the example data is generated by the makeover module 103 and stored in the storage 239. The example data can include example photos, example videos, example posts, example documents, example status updates, etc. In some implementations, for generating profile review data, the preview module 204 retrieves the example data from the storage 239 and modifies the example data based at least in part on the selected profile impression. For example, assume that a user 125 selects a rock star profile impression. The preview module 204 determines profile preview data that will create the impression that the user 125 lives a rock star lifestyle. For example, the profile preview data includes photos, videos and/or status updates that feature the user 125 at parties and band performances, and removes any photos, videos and/or status updates that are inconsistent with the rock star lifestyle (e.g., professional activities, routine activities, etc.).

In some implementations, the preview module 204 retrieves criteria data from the storage 239 and determines profile preview data based at least in part on the criteria. For example, data describing a profile impression in the catalog also specifies a set of criteria for the way of showing user content stream for the profile impression. The preview module 204 modifies the user's source data or the example data based at least in part on the criteria and generates the profile preview data accordingly. For example, the criteria for a professional profile impression specify features for work related content and features for content contradictory to work. The preview module 204 determines the profile preview data by finding the features in the content and processing the content based at least in part on which kinds of features the content has.

In some implementations, the preview module 204 applies a content detection algorithm to the user's source data or example data. The preview module 204 determines appropriate content and inappropriate content by applying the content detection algorithm based at least in part on the selected profile impression. A content detection algorithm can be any technologies for determining specific content from source content, e.g., videos, photos, documents, etc. For example, the preview module 204 applies a content detection algorithm to determine work related content for a professional profile impression. For example, the preview module 204 searches and determines images describing users wearing suites in a video. The preview module 204 determines profile preview data by applying such a content detection algorithm.

Figure 6A:
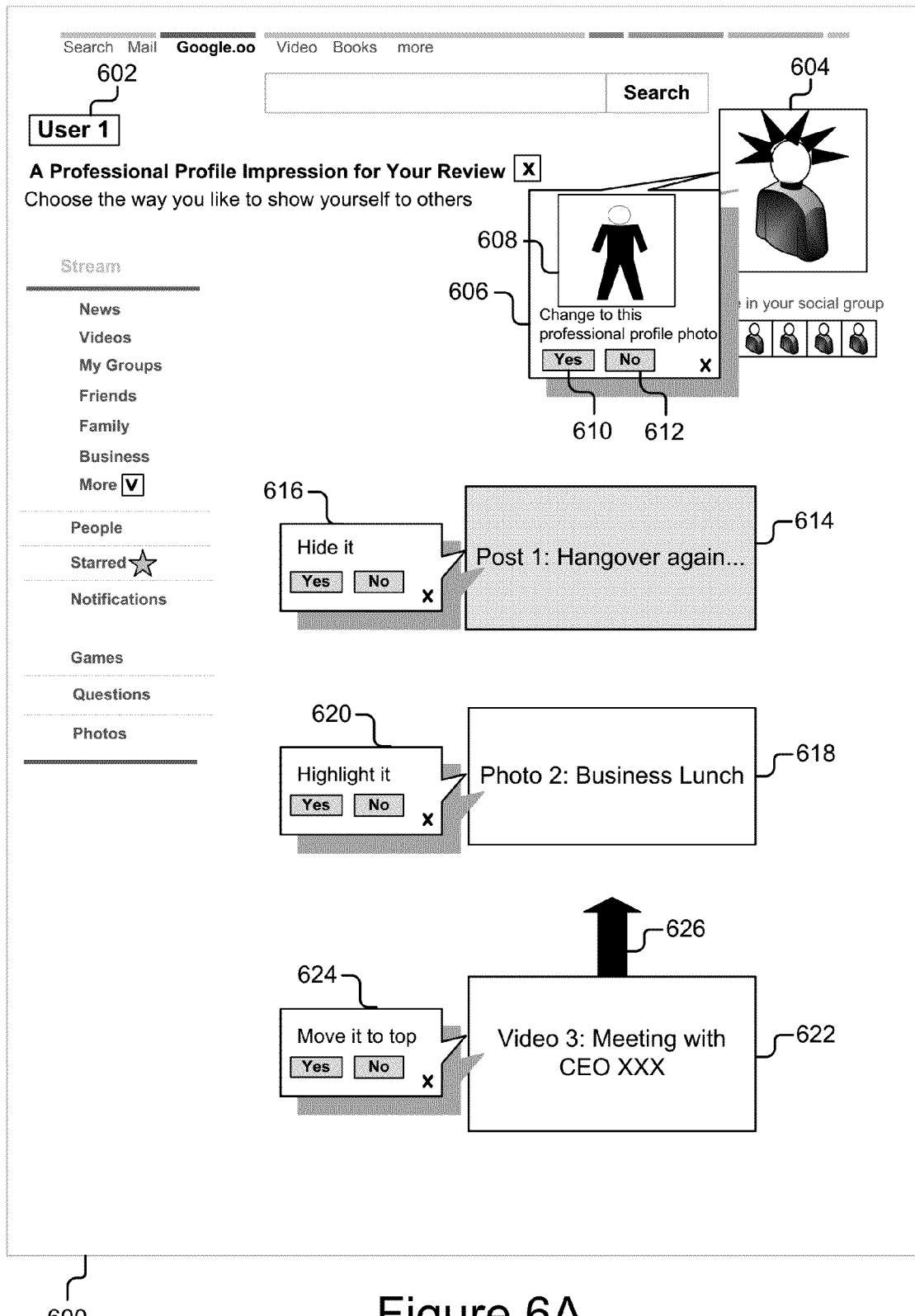
FIG. 6A is a graphic representation of an example user interface for displaying profile preview data.

In some implementations, the preview module 204 stores the profile preview data in the storage 239. In some implementations, the preview module 204 sends the profile preview data to the GUI module 212 and instructs the GUI module 212 to determine graphical data for generating a profile impression review interface to display the profile preview data on a user device 115. The profile impression review interface includes the profile preview data. For example, the profile impression review interface displays the profile preview data for the user to review and input review data indicating whether the user agrees with the changes to be made to the content. An example of a profile impression review interface is shown in FIG. 6A and will be described in detail below with reference to FIG. 6A.

The determination module 206 can be software including routines for determining profile impression data based at least in part on profile preview data and user review data. In some implementations, the determination module 206 can be a set of instructions executable by the processor 235 to provide the functionality described below for determining profile impression data based at least in part on user review data. In some implementations, the determination module 206 can be stored in the memory 237 of the computing device 200 and can be accessible and executable by the processor 235. The determination module 206 may be adapted for cooperation and communication with the processor 235 and other components of the computing device 200 via signal line 226.

In some implementations, the determination module 206 receives, via the network 105 and the controller 202, user review data describing one or more user review inputs provided to the profile impression review interface. In some instances, a user review input indicates whether the user agrees with a change of content specified by the profile preview data displayed in the profile impression review interface. For example, a profile impression review interface displays the profile preview data that describes hiding a party video for a professional profile impression selected by a user 125. The user 125 clicks an "agree" or "yes" button in the profile impression review interface, causing the determination module 206 receives, via the network 105 and the controller 202, a user review input indicating that the user agrees to hide the party video.

In some implementations, the determination module 206 receives, via the controller 202, profile preview data describing one or more recommended changes for the source data associated with the user 125. In some implementations, the determination module 206 determines profile impression data describing changed content based at least in part on the profile preview data and the user review data. In some instances, if the user review data indicates that the user 125 agrees with a recommended change of content described by the profile preview data, the determination module 206 changes the content as specified by the profile preview data (e.g., remove the photo from the content stream). For example, if a user 125 agrees to hide a photo showing some beer cans for a professional profile impression, the determination module 206 determines the profile impression data by removing the photo showing beer cans from the user content stream. In some instances, if the user review data indicates that the user 125 disagrees with a change of a content (e.g., hiding a photo), the determination module 206 keeps the content as it is in the source data (e.g., keep the photo in the content stream).

In some implementations, the determination module 206 modifies an Access Control List ("ACL") for the user's 125 source data based at least in part on the user review data. An ACL specifies which content in the source data needs to be shown and which content in the source data needs to be hidden. The determination module 206 modifies the ACL for the user's source data based at least in part on the user review data so that the ACL for the user's source data describes which content is to be shown and which content is to be hidden in the resulting user content stream. For example, the user 125 submits review data indicating to show photos that include the user wearing suites. The determination module 206 modifies the ACL based at least in part on the review data and the modified ACL describes that the photos including the user wearing suites are to be shown. If the user 125 submits review data indicating to hide beer can photos, the determination module 203 modifies the ACL and the modified ACL describes that the beer can photos are to be hidden. In some implementations, the determination module 206 determines profile impression data based at least in part on the ACL for the user's 125 source data.

In some implementations, the determination module 206 determines profile impression data by modifying posts. In some instances, the determination module 206 changes vocabulary for posts. For example, the determination module 206 replaces informal words or languages (e.g., words listed in a blacklist) in posts with formal words for a professional profile impression. In some instances, the determination module 206 improves grammar for posts. The determination module 206 corrects grammar errors in the posts to make the user content more professional. In some implementations, the preview module 204 determines profile preview data that describes suggestions for changing the vocabulary and/or grammar for posts. After the user inputs review data to indicate if the user 125 agrees with the suggestions, the determination module 206 performs the changes for the posts.

In some implementations, the determination module 206 determines profile impression data by modifying pictures and videos. For example, the determination module 206 removes an entire picture or an entire video including images that show beer cans based at least in part on user review data. In some instances, the determination module 206 removes only a portion of an entire picture or only a few scenes of an entire video that shows beer cans. In some implementations, the preview module 204 determines profile preview data that describes suggestions for modifying pictures and videos. After the user inputs review data to indicate if the user 125 agrees with the suggestions, the determination module 206 performs the changes for the pictures and videos.

In some implementations, the determination module 206 modifies ranking of content to be displayed in the user content stream. For example, the determination module 206 ranks a content higher or lower based at least in part on the user review data. In some implementations, the determination module 206 highlights some content based at least in part on the user review data. For example, the determination module 206 highlights more work related content for a professional profile impression and more party related content for a rock star profile impression.

In some implementations, the determination module 206 sends the profile impression data to the GUI module 212 and instructs the GUI module 212 to determine graphical data for generating a GUI that displays the changed user content stream on the user device 115. In some implementations, the determination module 206 stores the profile impression data in the storage 239.

The interest module 208 can be software including routines for modifying user interests based at least in part on user feedback. In some implementations, the interest module 208 can be a set of instructions executable by the processor 235 to provide the functionality described below for modifying user interests based at least in part on user feedback. In some implementations, the interest module 208 can be stored in the memory 237 of the computing device 200 and can be accessible and executable by the processor 235. The interest module 208 may be adapted for cooperation and communication with the processor 235 and other components of the computing device 200 via signal line 228. The interest module 208 is depicted in FIG. 2 using a dashed line to indicate that it is an optional element for the makeover module 103. Accordingly, in some implementations, the makeover module 103 does not include the interest module 208 and the functionality of the interest module 208 is performed by the determination module 206.

In some implementations, the interest module 208 receives user input describing a user selection of a profile impression and modifies user interests based at least in part on the user selection. In some implementations, the interest module 208 receives user review data describing one or more user review inputs provided to the profile impression review interface and modifies user interests based at least in part on the user review data. In some implementations, the interest module 208 sends the modified user interests to the social network server 101 to provide product experience to the user 125 or to personalize product settings based at least in part on the modified user interests. For example, if a user 125 selects a professional profile impression and submits review inputs indicating the user 125 agrees with most of the changes for the professional profile impression, the interest module 208 adds a new interest in professional in the user interests. The social network server 101 then provides a product and/or product settings to the user 125 based at least in part on the new interest.

The evaluation module 210 can be software including routines for evaluating profile impression data. In some implementations, the evaluation module 210 can be a set of instructions executed by the processor 235 to provide functionality described below for evaluating profile impression data. In some implementations, the evaluation module 210 can be stored in the memory 237 of the computing device 200 and can be accessible and executable by the processor 235. The evaluation module 210 may be adapted for cooperation and communication with the processor 235 and other components of the computing device 200 via signal line 230.

In some implementations, the evaluation module 210 compares user content before and after change to determine the content differences. For example, the evaluation module 210 compares the profile impression data for a professional profile impression to the user's source data and determines the difference. The evaluation module 210 determines that work related content (e.g., photos or videos including users wearing suites, posts including work discussion, etc.) ranks higher in the profile impression data than in the user's source data. The evaluation module 210 also determines that some work unrelated content appearing in the user's source data does not appear in the profile impression data for a professional profile impression. In some implementations, the evaluation module 210 generates a summary including difference between the user's source data and the profile impression data and instructs the GUI module 212 to generate a user interface displaying the summary in the user device 115.

In some implementations, the evaluation module 210 evaluates user content based at least in part on statistical data. In some instances, the statistical data describes a general behavior based at least in part on data from a large amount of users. In some instances, the evaluation module 210 determines whether user content exemplifies a profile impression based at least in part on statistical data. In some instances, the evaluation module 210 determines a set of standards based at least in part on statistical data. The evaluation module 210 then compares user content with the set of standards to determine whether the user content exemplifies a profile impression. In some instances, the user content is determined to exemplify a profile impression if the user content matches or approximately matches the set of standards. For example, assume that a user 125 selects a professional profile impression. The evaluation module 210 processes user's 125 source data based at least in part on statistical data and determines how professional the user 125 is perceived if showing the user's source data in the content stream. After profile impression data for the professional profile impression is determined, the evaluation module 210 processes the profile impression data based at least in part on the statistical data and determines how professional the user 125 is perceived if showing the profile impression data in the content stream. In some implementations, the evaluation module 210 sends evaluation data describing whether the user content exemplifies a profile impression to the GUI module 212 and instructs the GUI module 212 to generate a user interface displaying the evaluation data in a user device 115. Examples of such a user interface will be described in detail with reference to FIG. 7A-7C.

The GUI module 212 can be software including routines for presenting or formatting information for presentation to the user. For example, the GUI module 212 cooperates with a web browser (not pictured) on the user device 115 to generate the displays of the present disclosure. Examples of a user interface generated by the GUI module 212 will be described in more detail below with reference to FIGS. 6A-7C.

In some implementations, the GUI module 212 cooperates with the controller 202 to receive a user input describing a selection of a profile impression. In some implementations, the GUI module 212 retrieves data included in the profile impression catalog from the storage 239 for the user 125 to select. In some implementations, the GUI module 212 cooperates with the preview module 204 to display a profile impression review interface to the user 125 and cooperates with the determination module 206 to receive user review data from the user device 115. In some implementations, the GUI module 212 cooperates with the determination module 206 to display profile impression data to the user 125. In some implementations, the GUI module 212 cooperates with the evaluation module 210 to display evaluation data to the user. The GUI module 212 is coupled for communication with the processor 235 and other components of the computing device 200 via signal line 232.

One or more of the controller 202, the preview module 204, the determination module 206, the interest module 208, the evaluation module 210, and the GUI module 212 are executable on the processor 235; store data that, when executed by the processor 235, causes the collectors/modules to perform the operations described herein; are instructions executable by the processor 235 to provide the functionality described herein; or are stored in the memory 237 of the social network server 101 and are accessible and executable by the processor 235.

Figure 3:
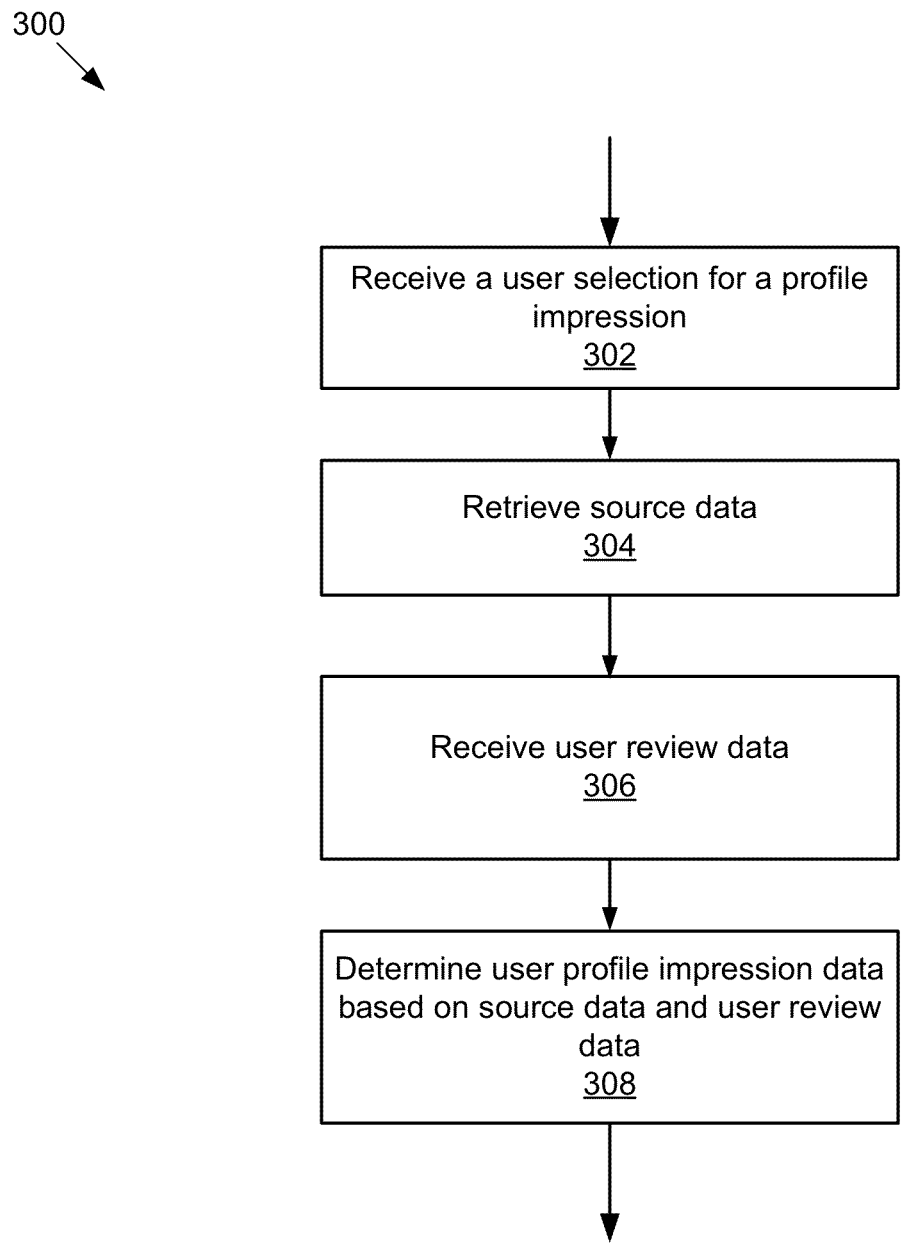
FIG. 3 is a flowchart of an example method for determining a user profile impression.

Referring now to FIG. 3, an example of a method 300 for determining user profile impression data is described. The method 300 can include receiving 302 a user 125 selection for a profile impression. For example, as described above, the controller 202 receives a user input describing a selection of a profile impression. Such a profile impression can be a professional profile impression, a rock star profile impression, a parent profile impression, a student profile impression, an expert profile impression, etc. The method 300 may continue by retrieving 304 source data. For example, the preview module 204 retrieves the user's source data describing user activities (e.g., posts, photos, videos, documents, etc.) submitted to the social network application 109. The method 300 can also include receiving 306 user review data. In some implementations, the preview module 204 provides a profile impression review interface to the user and the user gives feedback to user review data. The method 300 can include determining 308 user profile impression data based at least in part on the source data and the user review data. For example, the determination module 206 modifies the user's 125 source data based at least in part on the user review data and determines profile impression data including modified source data (e.g., modified posts, photos, videos, etc.).

In some implementations, the method 300 may also include the additional step of evaluating the profile impression data. For example, the evaluation module 210 evaluates the profile impression data based at least in part on statistical data and generates evaluation data describing whether the profile impression data exemplifies the user selected profile impression.

Figure 4A:
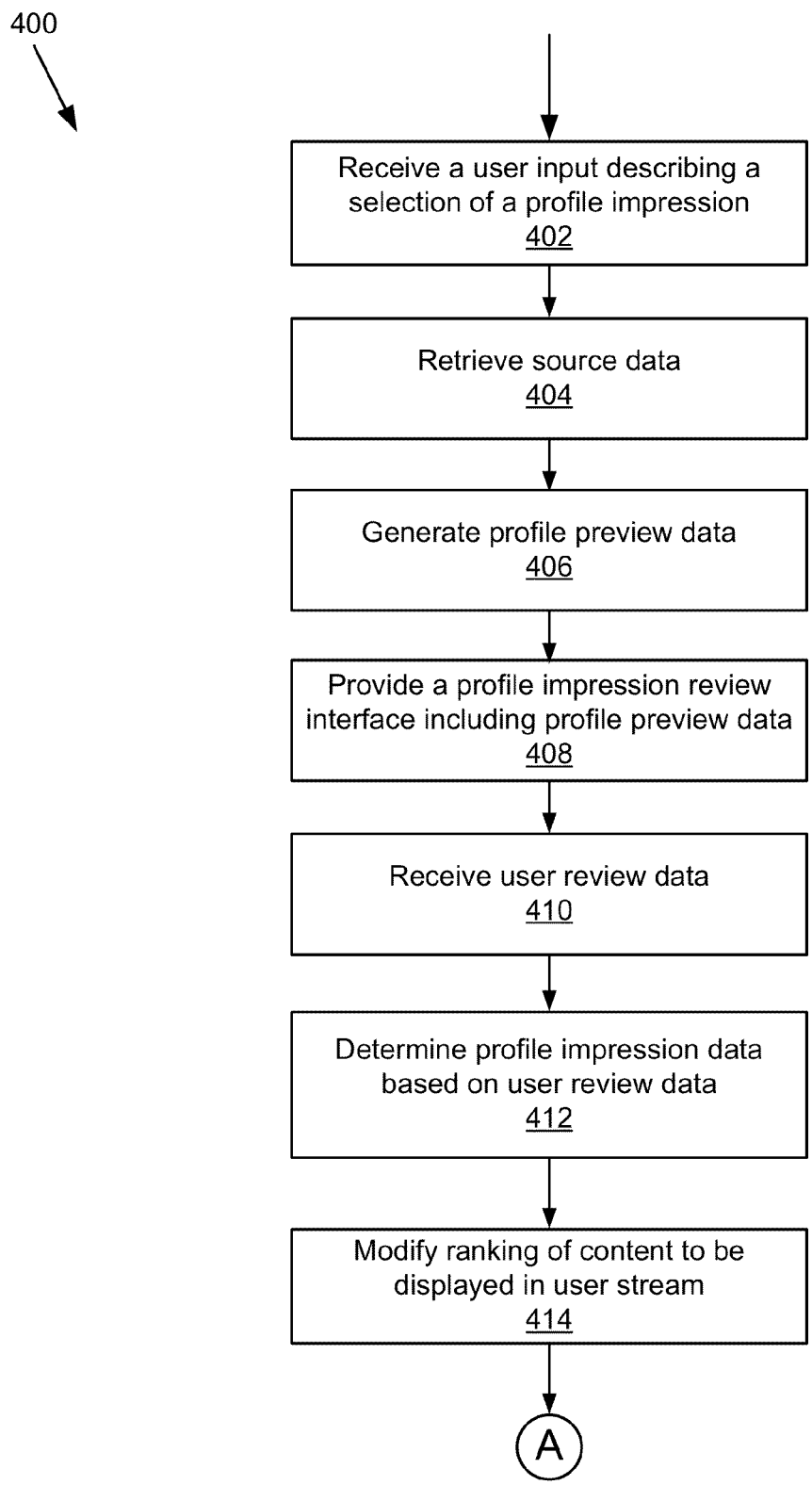
FIGS. 4A-4B are flowcharts of an example method for determining a user profile impression.
Figure 4B:
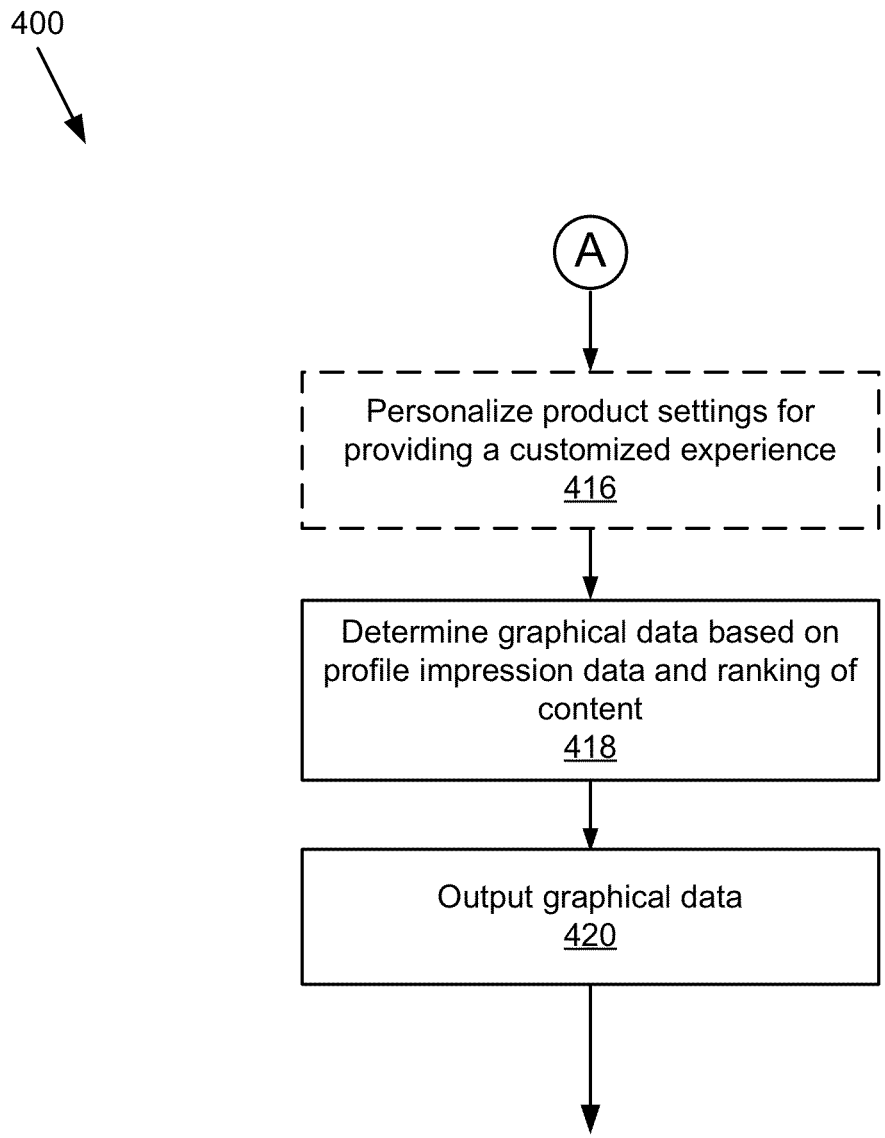

Referring now to FIGS. 4A-4B, an example method 400 for determining profile impression data is described. Turning to FIG. 4A, the method 400 can include receiving 402 a user input describing a selection of a profile impression and retrieving 404 source data. The method 400 may continue by generating 406 profile preview data. In some implementations, the preview module 204 generates profile preview data by modifying the user's 125 source data based at least in part on the selection of the profile impression. In some implementations, the preview module 204 generates profile preview data by processing example data based at least in part on the selection of the profile impression. The method 400 can include providing 408 a profile impression review interface including the profile preview data. For example, the preview module 204 instructs the GUI module 212 to generate a profile impression review interface for displaying the profile preview data on a display associated with the user device 115. The method 400 may continue by receiving 410 user review data. For example, the user review data is provided to the profile impression review interface. The method 400 can continue by determining 412 profile impression data based at least in part on the profile preview data and the user review data. One example of a process for determining 412 profile impression data based at least in part on the profile preview data and the user review data is described below in more detail with reference to FIG. 5. The method 400 can also include modifying 414 ranking of content to be displayed in user content stream.

Turning now to FIG. 4B, the method 400 may continue by personalizing 416 product settings for providing a customized experience. A process of personalizing 416 product settings for providing a customized experience is depicted in FIG. 4B using a dashed line to indicate that it is an optional process in the method 400. The method 400 can include determining 418 graphical data based at least in part on the profile impression data and the ranking of content. The method 400 can also include outputting 420 the graphical data. For example, the GUI module 212 cooperates with the web browser in the user device 115 to provide a user interface for displaying the graphical data to the user 125.

Figure 5:
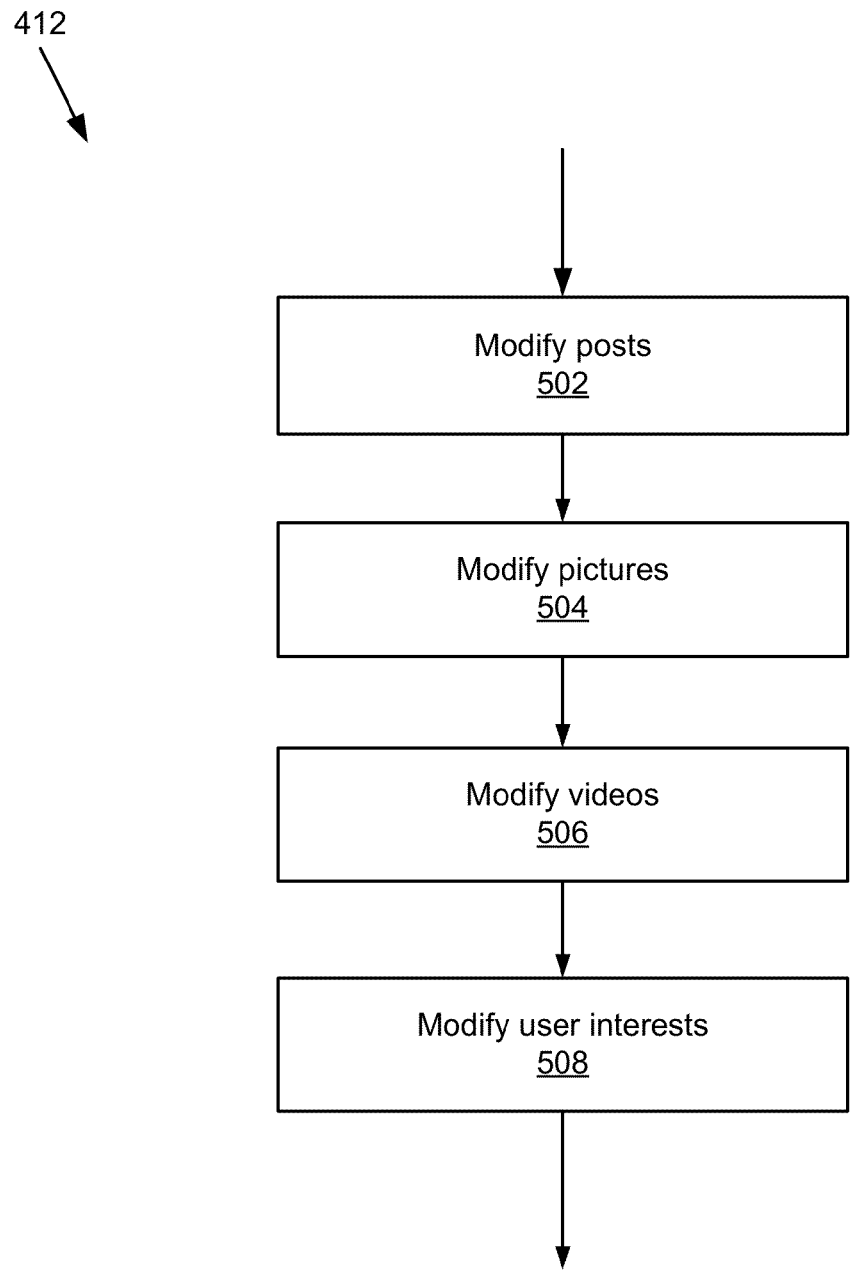
FIG. 5 is a flowchart of an example method for determining profile impression data for a user.

Referring now to FIG. 5, an example method 412 for determining the profile impression data based at least in part on the profile preview data and the user review data is described. The method 412 can include modifying 502 posts. For example, the posts in the user's 125 source data are modified based at least in part on vocabulary and grammar. The method 412 can also include modifying 504 pictures and modifying 506 videos. In the illustrated implementations, the method 412 can include modifying 508 user interests. For example, the user interests are modified based at least in part on the profile preview data and the user review data.

Figure 6B:
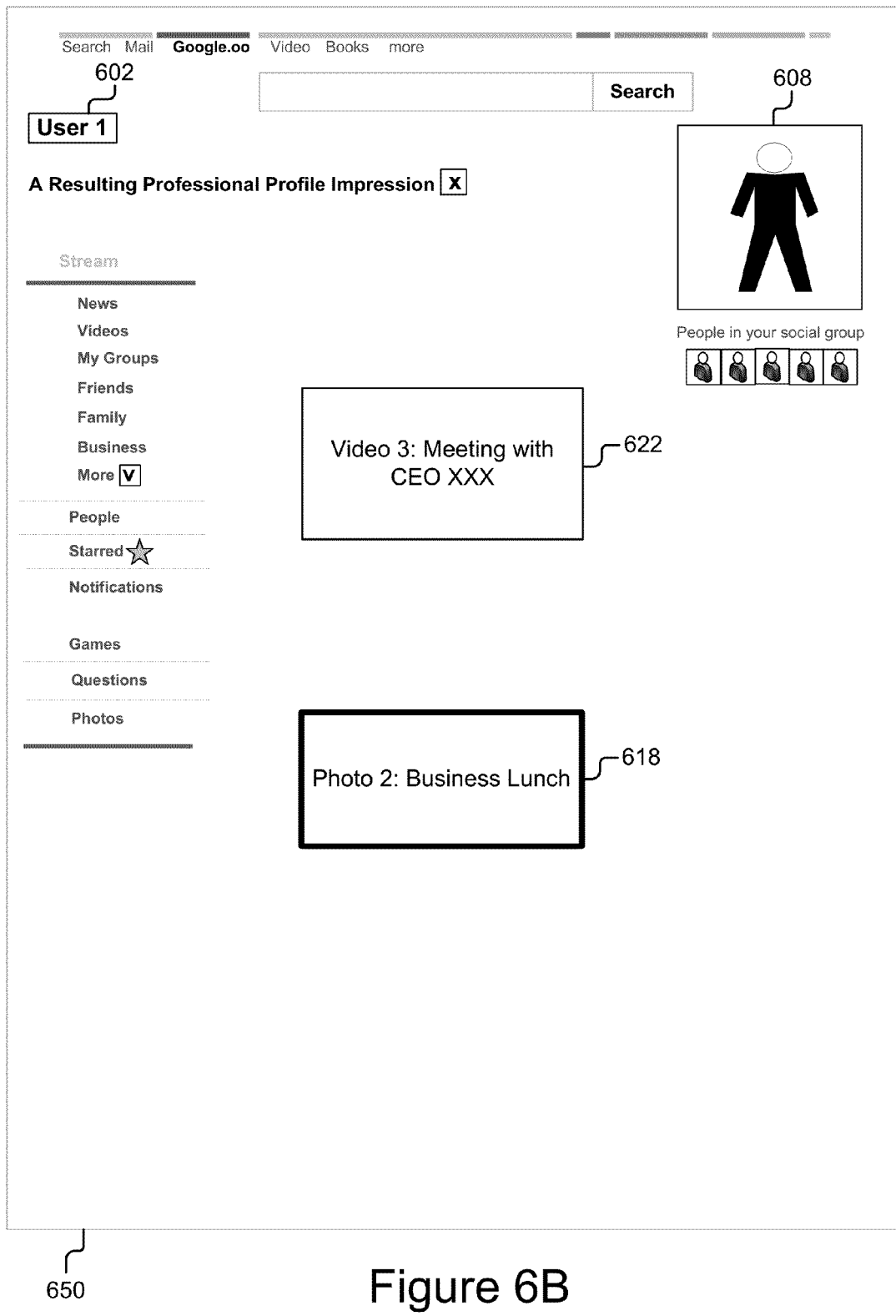
FIG. 6B is a graphic representation of an example user interface for displaying a resulting profile impression.

Referring now to FIGS. 6A-6B, graphic representations of example user interfaces generated by the GUI module 212 are depicted. FIG. 6A depicts a graphic representation of an example profile impression review user interface 600 for displaying profile preview data to a user in a social network. The profile impression review user interface 600 includes a user name representation 602, a user icon 604 and content 614, 618, 622. The user name representation 602 shows the user name for the user logged in the social network. The user icon 604 displays a profile photo of the user. The content 614, 618, 622 includes a post 614, a photo 618 and a video 622, posted in the user's social network.

The profile impression review user interface 600 also includes popup dialog boxes 606, 616, 620, 624. The popup dialog boxes 606, 616, 620, 624 provide the user options to input review data. The popup dialog box 606 includes a recommended profile photo 608 for a professional profile impression. The popup dialog box 606 also includes a "Yes" button 610 and a "No" button 612 which are clickable by the user to indicate if the user agrees to change to the recommended profile photo 608. The popup dialog box 616 provides the user an option to choose to perform a modification on the post 614, e.g., to hide the post 614. Similarly, the popup dialog box 620 provides the user an option to choose to perform a modification on the photo 618, e.g., to highlight the photo 618. The popup dialog box 624 provides the user an option to choose to perform a modification on the video 622, e.g., to move 626 the video 622 to top.

FIG. 6B depicts a graphic representation of an example user interface 650 for displaying modified user content for a professional profile impression. The user interface 650 includes a user name representation 602, a user icon 608 and content 622, 618. The user name representation 602 shows the user name for the user logged in the social network. The user icon 608 displays the profile photo for the user that is recommended in the profile impression review interface 600. The content 622, 618 includes the video 622 and the photo 618. The video 622 is moved to the top and the photo 618 is highlighted.

Figure 7A:
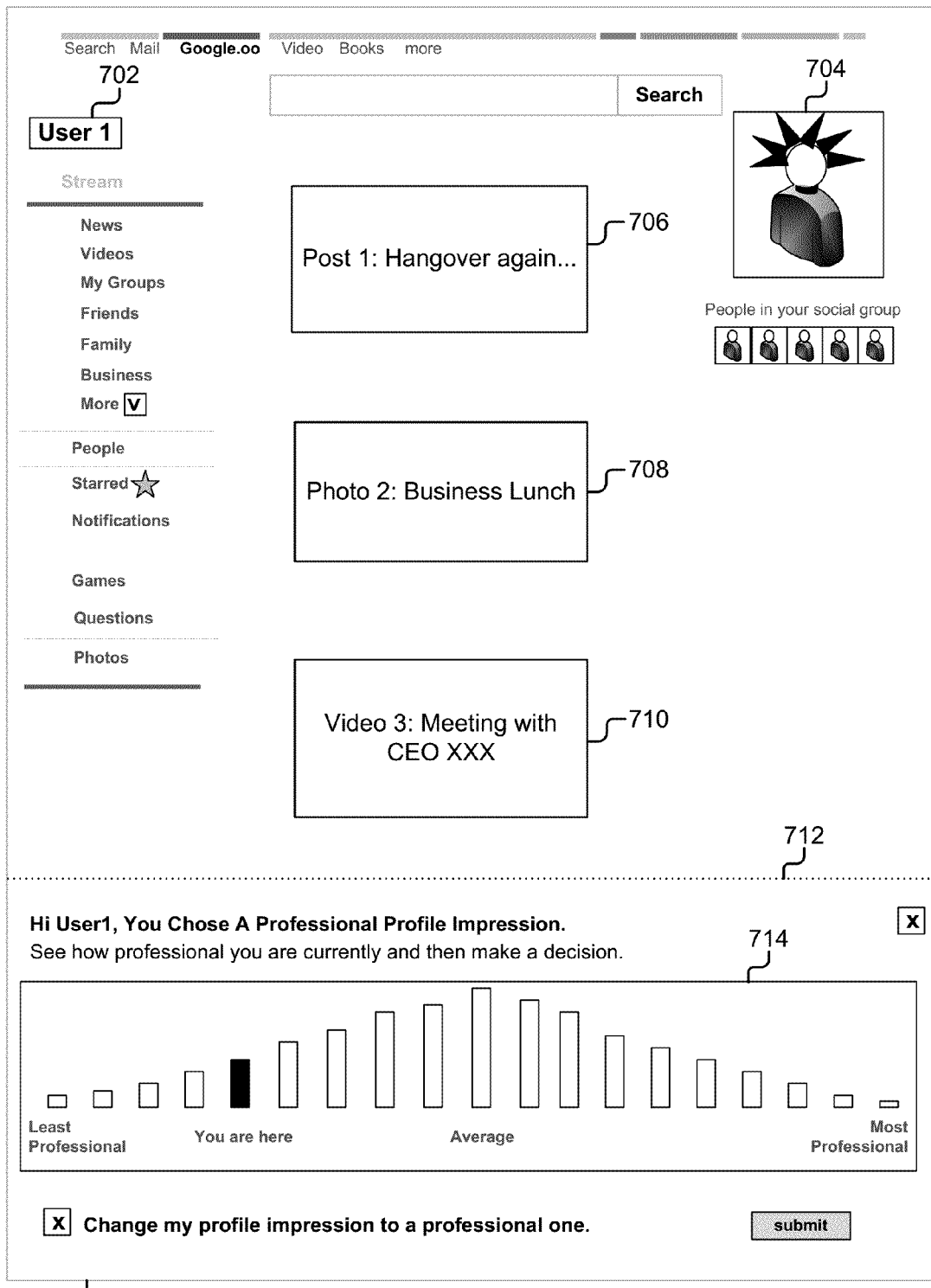
FIG. 7A is a graphic representation of an example user interface for displaying an evaluation chart that shows how professional original user content is.
Figure 7B:
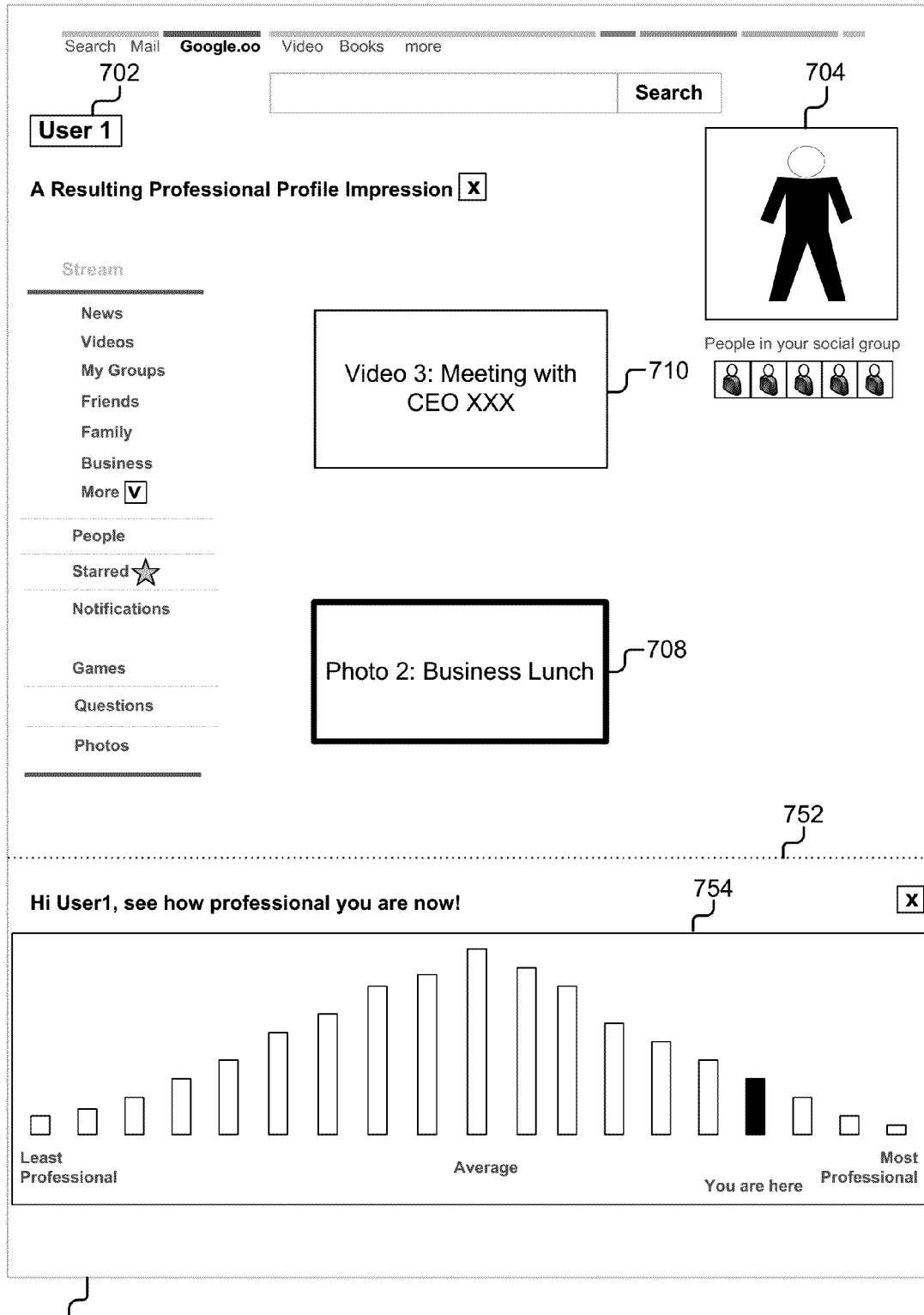
FIG. 7B is a graphic representation of an example user interface for displaying an evaluation chart that shows how professional a resulting profile impression is.
Figure 7C:
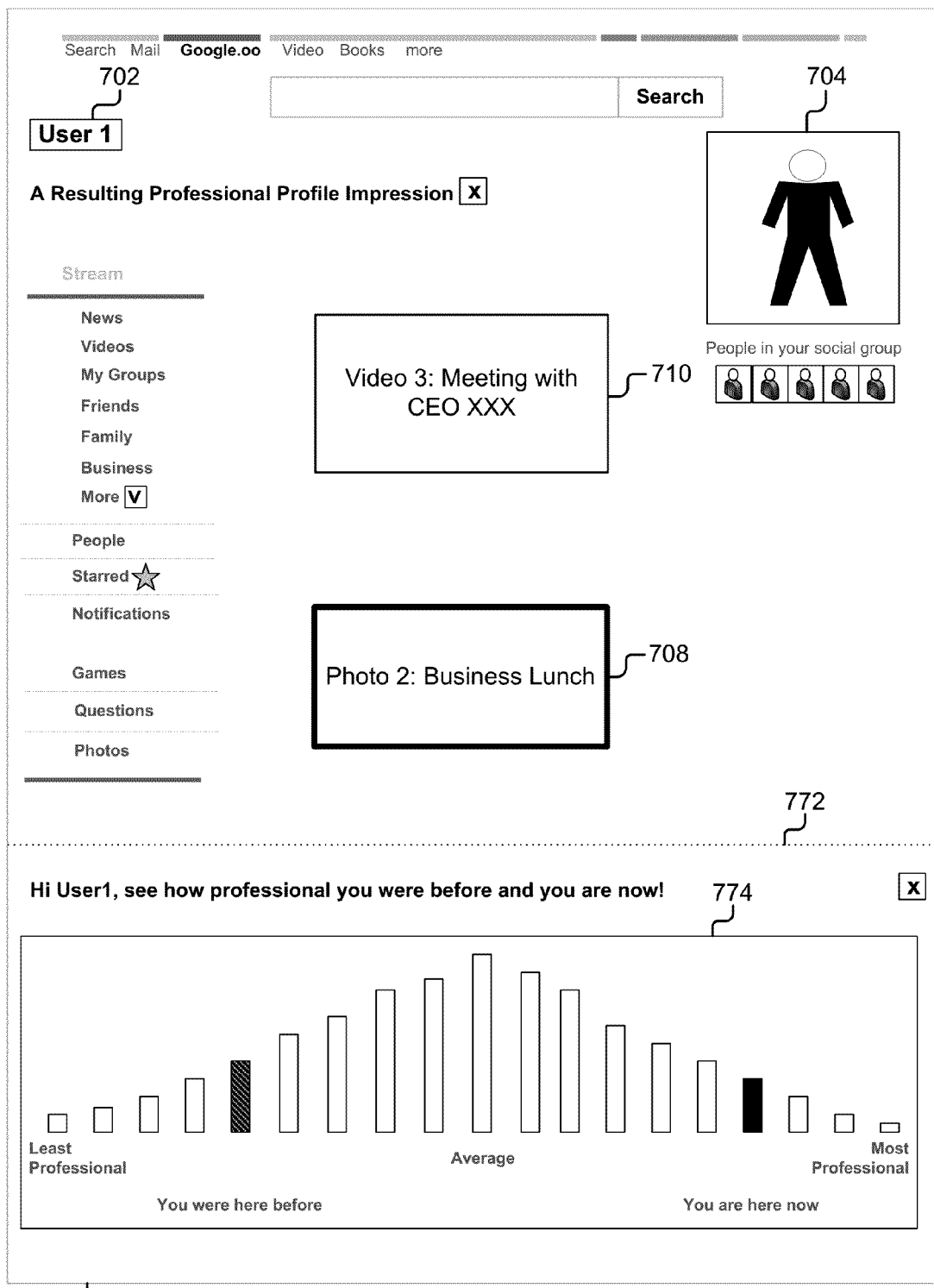
FIG. 7C is a graphic representation of an example user interface for displaying an evaluation chart that show how professional an original and a resulting profile impression are.

Referring now to FIGS. 7A-7C, graphic representations of example user interfaces generated by the GUI module 212 are depicted. FIG. 7A depicts a graphic representation of a user interface 700 for displaying an evaluation chart that shows how professional the original user content is. The user interface 700 includes a user name representation 702, a user icon 704 and content 706, 708, 710. The user interface 700 also includes an evaluation result display area 712 that shows an evaluation chart 714. The evaluation chart 714 indicates whether the user content stream exemplifies the selected professional profile impression.

FIG. 7B depicts a graphic representation of a user interface 750 for displaying an evaluation chart that shows how professional a resulting profile impression is. The user interface 750 includes a user name representation 702, a user icon 704 and content 710, 708. Comparing to FIG. 7A, the user icon 704 in FIG. 7B has been changed to a more professional picture. The user interface 750 also includes an evaluation result display area 752 that shows an evaluation chart 754 for the selected professional profile impression. The evaluation chart 754 indicates whether the modified user content stream exemplifies the selected professional profile impression.

FIG. 7C depicts a graphic representation of a user interface 770 for displaying an evaluation chart that shows how professional the original and the resulting profile impression are. The user interface 770 includes a user name representation 702, a user icon 704 and content 710, 708. Comparing to FIG. 7A, the user icon 704 in FIG. 7C has been changed to a more professional picture. The user interface 770 also includes an evaluation result display area 772 that shows an evaluation chart 774. The evaluation chart 774 indicates whether the original user content stream and the modified user content stream exemplify the selected professional profile impression.

Systems and methods for changing user profile impression in a social network have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in some implementations below with reference to user interfaces and particular hardware. Moreover, the technologies are disclosed above primarily in the context of a social network server; however, the disclosed technologies apply to other data sources and other data types (e.g., collections of other resources, images, audio, web pages, etc.).

Reference in the specification to "some implementations" or "an implementation" means that a particular feature, structure, or characteristic described in connection with the implementation is included in at least some implementations of the disclosed technologies. The appearances of the phrase "in some implementations" in various places in the specification are not necessarily all referring to the same implementation.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present disclosure can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
    receiving, by one or more processors, user input, the user input indicating a selected profile impression from a plurality of profile impressions, each profile impression comprising a respective configuration of a user profile;
    determining, by one or more processors, profile preview data based at least in part on the selected profile impression and source data describing one or more user activities, the profile preview data describing one or more recommended changes for the source data in view of the selected profile impression;
    providing, by the one or more processors, the profile preview data for display of a profile impression within a profile impression review interface, the profile impression comprising a set of graphical representations of source data and a set of graphical representations of one or more recommendations for potential changes to respective source data based at least in part on the selected profile impression, each graphical representation of a recommendation for potential changes enabling a user to at least accept or deny the respective recommendation;
    receiving, by one or more processors, user review data from the user, the user review data being input through at least one graphical representation in the set of graphical representations of one or more recommendations for potential changes and indicating whether the user agrees with at least one recommended change of the one or more recommended changes for the respective source data described by the profile preview data;
    determining, by one or more processors, profile impression data based at least in part on the profile preview data and the user review data, the profile impression data describing the one or more user activities based at least in part on the user review data; and
    providing, by the one or more processors, a resulting profile impression for display within the profile impression review interface, the resulting profile impression being based on the profile impression data, and comprising a sub-set of the set of graphical representation representations of source data.

2. The method of claim 1, wherein determining the profile preview data further comprises:
    retrieving the source data; and
    modifying the source data based at least in part on the selection of the profile impression.

3. The method of claim 2, wherein modifying the source data further comprises removing a portion of the source data based at least in part on the selection of the profile impression.

4. The method of claim 1, wherein determining the profile impression data further comprises:
    modifying an access control list for the source data based at least in part on the user review data; and determining the profile impression data based at least in part on the access control list.

5. The method of claim 1, wherein determining the profile impression data further comprises removing a portion of the source data based at least in part on the user review data.

6. The method of claim 1, wherein determining the profile impression data further comprises modifying a user interest based at least in part on the user review data.

7. A non-transitory computer-readable storage medium coupled to one or more processors and having instructions stored thereon which, when executed by the one or more processors, cause the one or more processors to perform operations comprising:
- receiving user input, the user input indicating a selected profile impression from a plurality of profile impressions, each profile impression comprising a respective configuration of a user profile;
- determining profile preview data based at least in part on the selected profile impression and source data describing one or more user activities, the profile preview data describing one or more recommended changes for the source data in view of the selected profile impression;
- providing the profile preview data for display of a profile impression within a profile impression review interface, the profile impression comprising a set of graphical representations of source data and a set of graphical representations of one or more recommendations for potential changes to respective source data based at least in part on the selected profile impression, each graphical representation of a recommendation for potential changes enabling a user to at least accept or deny the respective recommendation;
- receiving user review data from the user, the user review data being input through at least one graphical representation in the set of graphical representations of one or more recommendations for potential changes and indicating whether the user agrees with at least one recommended change of the one or more recommended changes for the respective source data described by the profile preview data;
- determining profile impression data based at least in part on the profile preview data and the user review data, the profile impression data describing the one or more user activities based at least in part on the user review data; and
- providing a resulting profile impression for display within the profile impression review interface, the resulting profile impression being based on the profile impression data, and comprising a sub-set of the set of graphical representation representations of source data.

8. The non-transitory computer-readable storage medium of claim 7, wherein determining the profile preview data further comprises:
- retrieving the source data; and
- modifying the source data based at least in part on the selection of the profile impression.

9. The non-transitory computer-readable storage medium of claim 8, wherein modifying the source data further comprises removing a portion of the source data based at least in part on the selection of the profile impression.

10. The non-transitory computer-readable storage medium of claim 7, wherein determining the profile impression data further comprises:
- modifying an access control list for the source data based at least in part on the user review data; and
- determining the profile impression data based at least in part on the access control list.

11. The non-transitory computer-readable storage medium of claim 7, wherein determining the profile impression data further comprises removing a portion of the source data based at least in part on the user review data.

12. The non-transitory computer-readable storage medium of claim 7, wherein determining the profile impression data further comprises modifying a user interest based at least in part on the user review data.

13. A system comprising:
- one or more processors; and
- a non-transitory computer-readable storage medium coupled to the one or more processors and having instructions stored thereon which, when executed by the one or more processors, cause the one or more processors to perform operations comprising:
  - receiving user input, the user input indicating a selected profile impression from a plurality of profile impressions, each profile impression comprising a respective configuration of a user profile;
  - determining profile preview data based at least in part on the selection of the selected profile impression and source data describing one or more user activities, the profile preview data describing one or more recommended changes for the source data in view of the selected profile impression;
  - providing the profile preview data for display of a profile impression within a profile impression review interface, the profile impression comprising a set of graphical representations of source data and a set of graphical representations of one or more recommendations for potential changes to respective source data based at least in part on the selected profile impression, each graphical representation of a recommendation for potential changes enabling a user to at least accept or deny the respective recommendation;
  - receiving user review data from the user, the user review data being input through at least one graphical representation in the set of graphical representations of one or more recommendations for potential changes and indicating whether the user agrees with at least one recommended change of the one or more recommended changes for the respective source data described by the profile preview data;
  - determining profile impression data based at least in part on the profile preview data and the user review data, the profile impression data describing the one or more user activities based at least in part on the user review data; and
  - providing a resulting profile impression for display within the profile impression review interface, the resulting profile impression being based on the profile impression data, and comprising a sub-set of the set of graphical representation representations of source data.

14. The system of claim 13, wherein determining the profile preview data further comprises:
- retrieving the source data; and
- modifying the source data based at least in part on the selection of the profile impression.

15. The system of claim 14, wherein modifying the source data further comprises removing a portion of the source data based at least in part on the selection of the profile impression.

16. The system of claim 13, wherein determining the profile impression data further comprises:
- modifying an access control list for the source data based at least in part on the user review data; and determining the profile impression data based at least in part on the access control list.

17. The system of claim 13, wherein determining the profile impression data further comprises removing a portion of the source data based at least in part on the user review data.

* * * * *